Nov. 10, 1931.  E. NESSAN  1,831,026
HAND CART FOR MILK CANS
Filed July 3, 1930  2 Sheets-Sheet 1
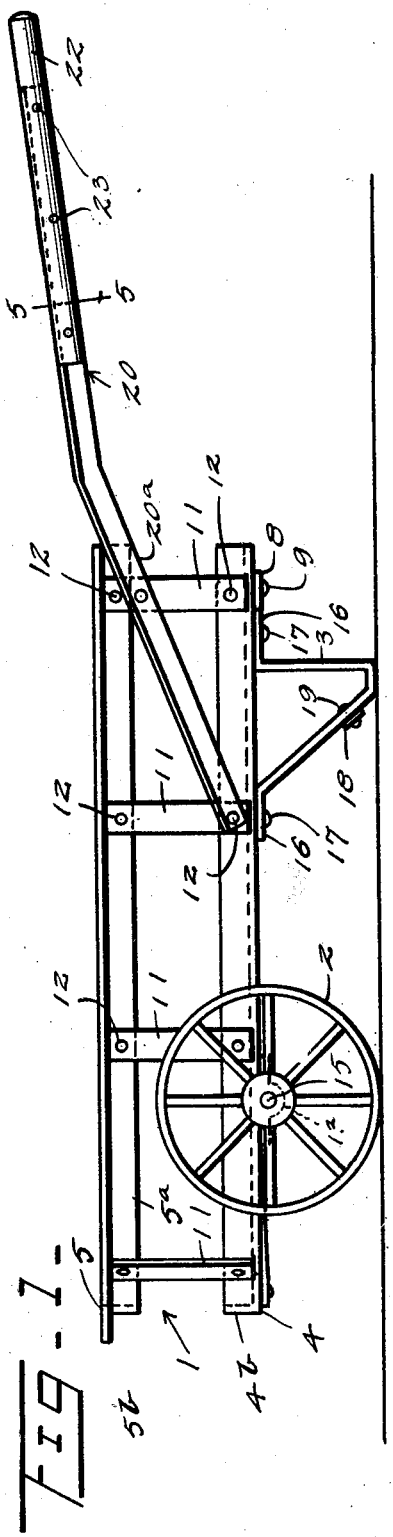
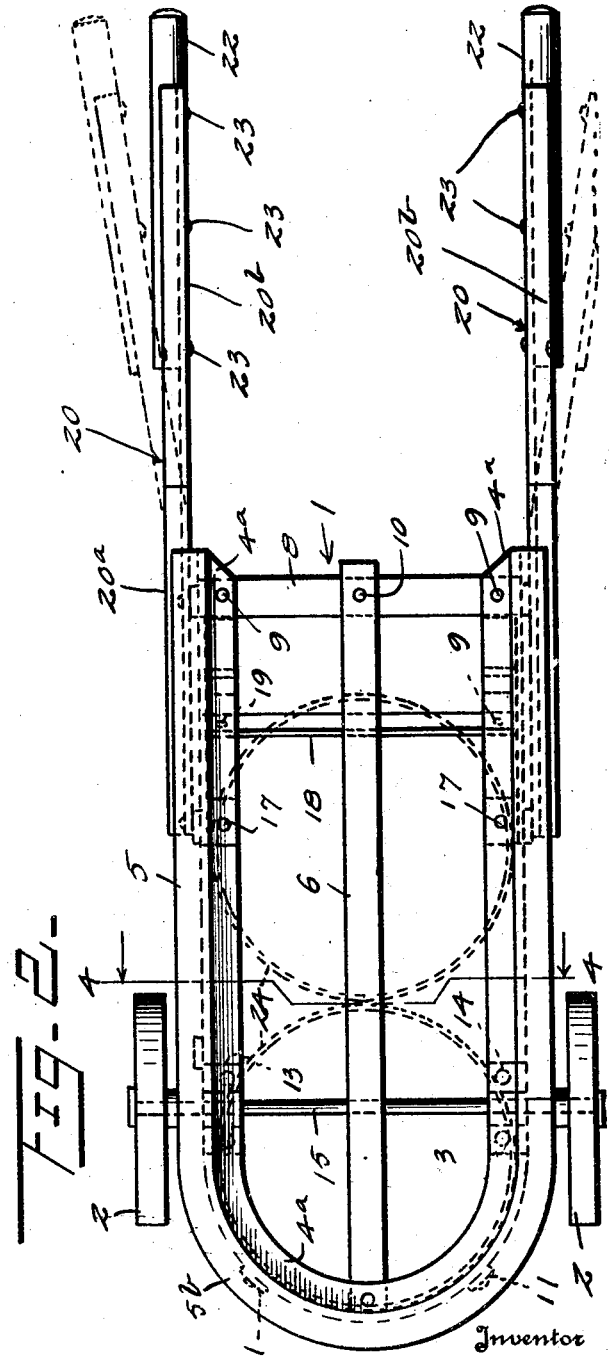
Inventor
Edwin Nessan
By Watson E. Coleman
Attorney

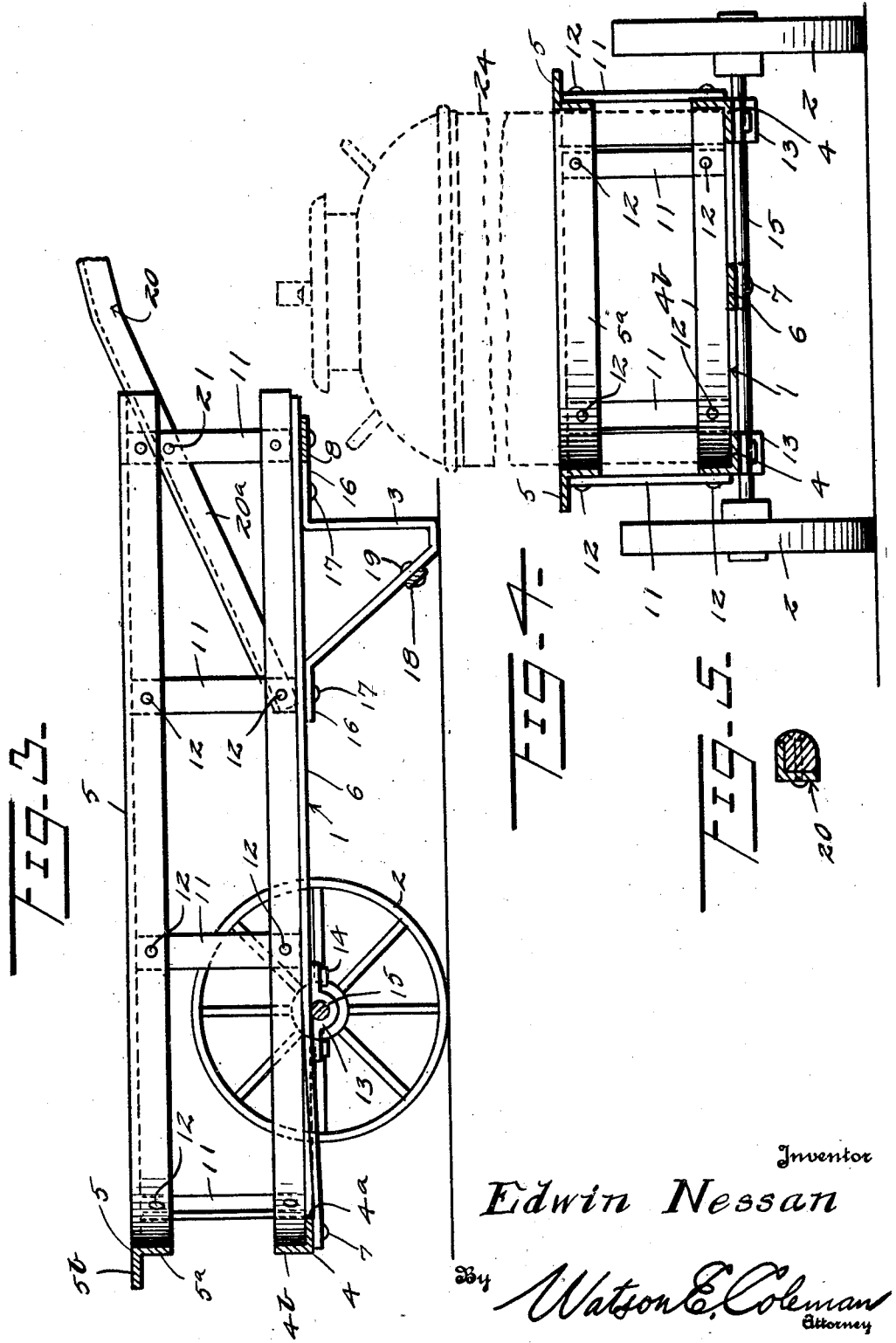

Patented Nov. 10, 1931

1,831,026

UNITED STATES PATENT OFFICE

EDWIN NESSAN, OF RENNER, SOUTH DAKOTA

HAND CART FOR MILK CANS

Application filed July 3, 1930. Serial No. 465,720.

This invention relates to carts, and has for one of its objects to provide a novel, simple, durable and inexpensive hand cart especially adapted to be used for the purpose of transporting milk cans in dairies or dairy farms or the like.

The invention has for a further object to provide a cart of the character stated which shall comprise a body adapted to receive one or more milk cans and hold them in upright position against the possibility of tilting over while the cart is supported in a downwardly and forwardly inclined position for movement and during the movement thereof.

The invention has for a further object to provide a cart of the character stated wherein the body shall be so related to the wheels that comparatively little weight of the body and the milk can or cans will be borne by the operator while holding the cart in position for movement and while moving the cart.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view in side elevation of the hand cart;

Figure 2 is a top plan view of the hand cart;

Figure 3 is a sectional view taken on a vertical plane extending longitudinally and centrally through the hand cart;

Figure 4 is a sectional view taken on the vertical plane indicated by the line 4—4 of Figure 2, and Figure 5 is a sectional view taken on the plane indicated by the line 5—5 of Figure 1.

The hand cart comprises a body 1 supported near its front end by wheels 2 and near its rear end by legs 3. The body 1, which is of U-form in plan, comprises a bottom bar 4 and a top bar 5 of U-form in plan and of angular formation in cross section. The bars 4 and 5 are each of one piece construction, and are arranged to position their bight portions at the front end of the body, to the end that the front end of the body will be closed and the rear end thereof open.

The bottom bar 4 has its horizontal flange $4^a$ extending inwardly from the lower edge of its vertical flange $4^b$. The flange $4^a$ and a strip 6 extending longitudinally and centrally of the bottom bar 4, constitute the bottom of the body 1. The strip 6 has its front end portion positioned in contact with the under side of the flange $4^a$ and is secured to said flange by a rivet 7. The greater portion of the strip 6 is located in a plane coincident with that in which the flange $4^a$ is located, and has its rear end portion positioned upon a cross bar 8 secured at its ends to the under sides of the rear end portions of the flange 6. The cross bar 8 is secured to the flange $4^a$ by rivets 9, and the strip 6 is secured to the cross bar by a rivet 10.

The top bar 5 is supported from the bottom bar 4 by vertical bars 11, and is arranged with its vertical flange $5^a$ extending downwardly from the inner edge of its horizontal flange $5^b$. The flange $5^a$ is located directly above the flange $4^b$, and these flanges constitute the sides and front end of the body 1. The vertical bars 11 have their ends secured against the outer surfaces of the flanges $4^b$ and $5^a$ by rivets 12.

Bearings 13 are secured by rivets 14 to the under sides of the flanges $4^a$ of the bottom bar 4, and are provided for the reception of an axle 15 upon which the wheels 2 are mounted.

The legs 3 are of substantially V-form in side elevation, and are provided at their upper ends with attaching extensions or flanges 16 which are secured by rivets 17 to the under sides of the flanges $4^a$ of the bottom bar 4. A brace bar 18 extends from one of the legs 3 to the other, and is secured to the legs by rivets 19.

Handle bars 20 of angular formation in cross section and embodying downwardly and forwardly inclined front portions $20^a$ and upwardly and rearwardly inclined and rearwardly diverging rear portions $20^b$, are secured to the sides of the body 1 through the medium of their front portions 28. The handle portions 28 are positioned against the outer surfaces of the rearmost vertical bars 11, and are secured to these bars by certain of the rivets 12 and by rivets 21. Hand grips 22, preferably of cylindrical formation and made of wood, are secured to the hand bars 20 by rivets 23, and have their rear end portions extending rearwardly beyond the handle bars.

The body 1 is deep and wide enough to snugly receive the lower end portions of two milk cans 24, as illustrated by broken lines in Figures 2 to 4. The front and lateral sides of the front milk can 24 contact with the inner side of the curved front end of the body 1, and the axle 15 is spaced rearwardly from said end of the body sufficiently to position the greater portion of this milk can forwardly beyond the axle.

The length of the body 1 is greater than the combined diameters of the milk cans 24, and the rear milk can is positioned in contact with the front milk can. As the rear end of the body 1 is fully open, the milk cans 24 may be readily placed in the body. As the milk cans 24 have snug contact with the sides of the body 1, as the front milk can has snug contact with the curved front end of the body, and as the rear milk can contacts with the front milk can, the cans will be held against accidental tilting when the body is supported in the forwardly and downwardly inclined position, which position it occupies while the cart is in motion. As the greater portion of the front milk can 24 is positioned beyond the axle 15, little effort will be required to raise the body 1 into its downwardly and forwardly inclined position and to support it in such position. All parts of the cart, with the exception of the hand grip bars 22, are made of metal, and all parts of the cart are riveted together. In view thereof, the cart is strong and durable.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

A hand cart for milk cans, comprising bottom and top bars of U form in plan and arranged in spaced parallel relation with their bight portions at the front end of the cart, the bars being of angular formation in cross section and presenting vertical and horizontal flanges, the vertical flange of the top bar being located directly above the corresponding flange of the bottom bar, the horizontal flange of the top bar extending outwardly from the upper edge of the vertical flange, the horizontal flange of the bottom bar extending inwardly from the lower edge of the vertical flange, upright bars secured to the outer sides of the vertical flanges of the top and bottom bars and holding said bars in fixed position with respect to each other, a cross bar secured to the lower side of the rear end portions of the horizontal flange of the bottom bar, a strip extending longitudinally and centrally of the bottom bar and having its front end secured to the lower side of the horizontal flange of this bar and having its rear end positioned upon and secured to the cross bar, bearings secured to the lower side of the horizontal flange of the bottom bar, an axle mounted in the bearings, wheels carried by the axle, and handles secured to the outer side of the vertical flange of the bottom bar and to certain of said upright or spacing bars.

In testimony whereof I hereunto affix my signature.

EDWIN NESSAN.